(12) United States Patent
Matsumoto (10) Patent No.: US 8,417,278 B2
(45) Date of Patent: Apr. 9, 2013

(54) WIRELESS COMMUNICATION SYSTEM, COMMUNICATION TERMINAL DEVICE, METHOD OF CONTROLLING TRANSMISSION POWER THEREOF, AND PROGRAM

(75) Inventor: Tatsuki Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/281,366

(22) PCT Filed: Feb. 23, 2007

(86) PCT No.: PCT/JP2007/000119
§ 371 (c)(1),
(2), (4) Date: Sep. 2, 2008

(87) PCT Pub. No.: WO2007/099699
PCT Pub. Date: Sep. 7, 2007

(65) Prior Publication Data
US 2009/0137264 A1 May 28, 2009

(30) Foreign Application Priority Data
Mar. 1, 2006 (JP) .................. 2006-054439

(51) Int. Cl.
*H04B 7/00* (2006.01)
(52) U.S. Cl. .......................... 455/522; 455/69; 370/318
(58) Field of Classification Search .................. 455/63.1, 455/67.11, 67.13, 69, 522; 370/318
See application file for complete search history.

(56) References Cited

U.S. PATENT DOCUMENTS

| 6,621,880 | B1 * | 9/2003 | Niesen | 375/340 |
|---|---|---|---|---|
| 7,031,674 | B2 * | 4/2006 | Kataoka et al. | 455/115.1 |
| 7,454,222 | B2 * | 11/2008 | Huang et al. | 455/522 |
| 2003/0103577 | A1 | 6/2003 | Harada et al. | |
| 2005/0026566 | A1 * | 2/2005 | Dabak et al. | 455/67.11 |
| 2006/0133458 | A1 * | 6/2006 | Ueno | 375/148 |
| 2006/0211391 | A1 * | 9/2006 | Nishikawa et al. | 455/226.1 |
| 2007/0149234 | A1 * | 6/2007 | Bomash | 455/522 |

FOREIGN PATENT DOCUMENTS

| EP | 1317078 A2 | 6/2003 |
|---|---|---|
| EP | 1435698 A | 7/2004 |
| JP | 2005123658 A | 5/2005 |
| JP | 2005328355 A | 11/2005 |

OTHER PUBLICATIONS

International Search Report for PCT/JP2007/000119 mailed Apr. 3, 2007.
European search report for EP07713501.0 dated Nov. 30, 2012.

* cited by examiner

*Primary Examiner* — Raymond Dean (57) ABSTRACT

A de-spreading unit 104 de-spreads a path timing information after A/D conversion, using a specified code of a signal from an RF unit 102; a TPC judgment unit 106 makes a decision of valid TPC data, if the de-spread signal was found to contain a symbol data of a CPICH, for which channel estimation has been completed on the same time axis with a symbol data of a TPC for each base station, at a correct position; and transmission power control unit 107 controls transmission power of the RF unit 102 so as to attain transmission power adapted to the TPC result.

20 Claims, 5 Drawing Sheets

WIRELESS COMMUNICATION SYSTEM, COMMUNICATION TERMINAL DEVICE, METHOD OF CONTROLLING TRANSMISSION POWER THEREOF, AND PROGRAM

TECHNICAL FIELD

The present invention relates to a technique of controlling power while judging reliability of a transmission power control signal, so as to prevent a base station from being brought into unexpected power control.

BACKGROUND ART

In communication based on the CDMA (Code Division Multiple Access) system excessively raised transmission power of a communication terminal device may cause, by its nature, large interference with signals sent by other users, and excessively lowered transmission power may make signals non-discriminatable as being buried in interference among communication terminal devices, only to fail in sending the signals to a base station as a destination.

For this reason, communication is established by appropriately controlling, on the base station side, transmission power using a transmission power control signal (referred to as "TPC (Transmitter Power Control)", hereinafter), so as to enable reception of signals from the individual communication terminal devices.

There has been proposed a technique of reducing mean transmission power, when reception error of a symbol other than a pilot symbol is detected in the process of controlling transmission power based on results of comparison between a result of measurement of reception quality of a pilot symbol in a received symbol and a target value for reception quality, by configuring a communication device on the reception side taking part in control so as to elevate the target value for reception quality, typically by an error detection unit for pilot symbol reception detecting an error in reception of the pilot symbol based on a known pilot symbol pattern, and an upstream TPC symbol generation unit performing transmission power control based on not only transmission power control based on result of comparison of reception quality, but also on result of detection of reception error of pilot symbol (see Patent Document 1, for example).

[Patent Document 1] Japanese Laid-Open Patent Publication No. 2005-328355

DISCLOSURE OF THE INVENTION

Subjects to be Solved by the Invention

The above-described conventional example has, however, been suffering from the problem below.

The TPC has no means of detecting error in received data, unlike the general symbol data, and carries out unmodified power control even if the TPC symbol should contain an error, so that the situation, if sustained, might adversely affect keeping of connection, or result in large interference with other users.

The present invention is conceived after considering the above-described situation, wherein an object of which is to enable power control while judging reliability of a TPC by confirming that a symbol position of a common pilot channel (referred to as "CPICH", hereinafter) which resides on the same time axis, used as a material for judging the reliability of TPC sent from a base station, is correct, so as to prevent the base station from being brought into unexpected power control.

Means for Solving the Subjects

A first wireless communication system of the present invention is a wireless communication system of a communication terminal device receiving, by wireless, a signal containing a TPC and a CPICH from a plurality of base stations, and sending, by wireless, a signal under a variable transmission power to the base stations, the system includes a detection unit detecting timing information of path timing from the received signal; a de-spreading unit de-spreading the received signal based on the detected timing information and a code specified corresponding to the received signal; a combiner unit extracting a symbol data of the CPICH from the de-spread received signal, based on channel estimation on the same time axis with a symbol data of the TPC for each of the base stations; a judgment unit judging, depending on whether the extracted symbol data of the CPICH falls in a predetermined region of judgment, whether the correspondent TPC is valid or invalid; and a transmission power control unit controlling the transmission power corresponding to the TPC judged as being valid.

A second wireless communication system of the present invention is a wireless communication system of a communication terminal device receiving, by wireless, a signal containing a TPC and a DPCH from a plurality of base stations, and sending, by wireless, a signal under a variable transmission power to the base stations, the system includes a detection unit detecting timing information of path timing from the received signal; a de-spreading unit de-spreading the received signal based on the detected timing information and a code specified corresponding to the received signal; a combiner unit extracting a pilot symbol of the DPCH from the de-spread received signal, based on channel estimation on the same time axis with a symbol data of the TPC for each of the base stations; a judgment unit judging, depending on whether the extracted pilot symbol of the DPCH falls in a predetermined region of judgment, whether the correspondent TPC is valid or invalid; and a transmission power control unit controlling the transmission power corresponding to the TPC judged as being valid.

A third wireless communication system of the present invention includes a converter unit executing A/D conversion of a received signal; a detection unit inputting the signal after A/D conversion to a predetermined circuit to thereby detect a correct path timing, and posting the timing information to a de-spreading unit; the de-spreading unit de-spreading the signal from the converter unit, based on the accepted timing information, and using a code specified corresponding thereto; a combiner unit sending, from the re-spread signal, a symbol data of a CPICH for which channel estimation has been completed on the same time axis with a symbol data of a TPC for each base station to a judgment unit; the judgment unit judging whether the accepted symbol data of the CPICH falls on a correct symbol position or not, and deciding it as a valid TPC data only when it falls on the correct position; and a transmission power control unit controlling transmission power of the converter unit, so as to attain transmission power adapted to the TPC result determined by the judgment unit and accepted from the judgment unit.

A communication terminal device of the present invention is a communication terminal device receiving, by wireless, a signal containing a TPC and a DPCH from a plurality of base stations, and sending, by wireless, a signal under a variable transmission power to the base stations, and has the wireless communication system of the present invention.

A first method of wireless communication is a method of wireless communication for a communication terminal device receiving, by wireless, a signal containing a TPC and a CPICH from a plurality of base stations, and sending, by wireless, a signal under a variable transmission power to the base stations, the method includes detecting timing information of path timing from the received signal; de-spreading the received signal based on the detected timing information and a code specified corresponding to the received signal; extracting a symbol data of the CPICH from the de-spread received signal, based on channel estimation on the same time axis with a symbol data of the TPC for each of the base stations; judging, depending on whether the extracted symbol data of the CPICH falls in a predetermined region of judgment, whether the correspondent TPC is valid or invalid; and controlling the transmission power corresponding to the TPC judged as being valid.

A second method of wireless communication is a method of wireless communication for a communication terminal device receiving, by wireless, a signal containing a TPC and a DPCH from a plurality of base stations, and sending, by wireless, a signal under a variable transmission power to the base stations, the method includes detecting timing information of path timing from the received signal; de-spreading the received signal based on the detected timing information and a code specified corresponding to the received signal; extracting a pilot symbol of the DPCH from the de-spread received signal, based on channel estimation on the same time axis with a symbol data of the TPC for each of the base stations; judging, depending on whether the extracted pilot symbol of the DPCH falls in a predetermined region of judgment, whether the correspondent TPC is valid or invalid; and controlling the transmission power corresponding to the TPC judged as being valid.

A third method of controlling transmission power includes a step of allowing a converter unit to carry out A/D conversion of a received signal; a step of allowing a path timing detection unit to input a signal after A/D conversion into a predetermined circuit and to detect a correct path timing, and posting the timing information to a de-spreading unit; a step of de-spreading a signal received from the converter unit using a specified code, based on timing information accepted by the de-spreading unit; a step of allowing a combiner unit to send, from the re-spread signal, a symbol data of a CPICH for which channel estimation has been completed on the same time axis with a symbol data of a TPC for each base station to a judgment unit; a step of allowing the judgment unit to judge whether the accepted symbol data of the CPICH falls on a correct symbol position or not, and to decide it as a valid TPC data only when it falls on the correct position; and a step of allowing a transmission power control unit to control transmission power of the converter unit, so as to attain transmission power adapted to the TPC result determined by the judgment unit and accepted from the judgment unit.

A first computer program of the present invention is a computer program for a communication terminal device receiving, by wireless, a signal containing a TPC and a CPICH from a plurality of base stations, and sending, by wireless, a signal under a variable transmission power to the base stations, the program allowing the communication terminal device to execute a detection process detecting timing information of path timing from the received signal; a de-spreading process de-spreading the received signal based on the detected timing information and a code specified corresponding to the received signal; a combining process extracting a symbol data of the CPICH from the de-spread received signal, based on channel estimation on the same time axis with a symbol data of the TPC for each of the base stations; a judgment process judging, depending on whether the extracted symbol data of the CPICH falls in a predetermined region of judgment, whether the correspondent TPC is valid or invalid; and a transmission power control process controlling the transmission power corresponding to the TPC judged as being valid.

A second computer program of the present invention is a computer program for a communication terminal device receiving, by wireless, a signal containing a TPC and a DPCH from a plurality of base stations, and sending, by wireless, a signal under a variable transmission power to the base stations, the program allowing the communication terminal device to execute a detection process detecting timing information of path timing from the received signal; a de-spreading process de-spreading the received signal based on the detected timing information and a code specified corresponding to the received signal; a combining process extracting a pilot symbol of the DPCH from the de-spread received signal, based on channel estimation on the same time axis with a symbol data of the TPC for each of the base stations; a judgment process judging, depending on whether the extracted pilot symbol of the DPCH falls in a predetermined region of judgment, whether the correspondent TPC is valid or invalid; and a transmission power control process controlling the transmission power corresponding to the TPC judged as being valid.

A third computer program of the present invention provides a program allowing a computer of a communication terminal device to execute a process capable of realizing the functions of the wireless communication system of the present invention.

Effect of the Invention

According to the present invention, correct power control may be enabled by excluding a less reliable TPC from objects to be judged, and thereby an ability of keeping connection may be prevented from degrading.

BRIEF DESCRIPTION OF THE DRAWINGS

The above and other objects, advantages and features of the present invention will be more apparent from the following description of certain preferred embodiments taken in conjunction with the accompanying drawings.

BEST MODES FOR CARRYING OUT THE INVENTION

The first embodiment of the present invention will be detailed referring to the attached drawings. The wireless communication system of this embodiment is incorporated in a communication terminal device. The communication terminal device receives, by wireless, a signal containing a TPC and a CPICH from a plurality of base stations, and sends, by wireless, a signal under a variable transmission power to the base stations.

The wireless communication system of this embodiment has a path search circuit 103 as a detection unit detecting timing information of path timing from the received signal; a de-spreading unit 104 as a de-spreading unit de-spreading the received signal based on the detected timing information and a code specified corresponding to the received signal; a combiner unit 105 as a combiner unit extracting a symbol data of the CPICH from the de-spread received signal, based on channel estimation on the same time axis with a symbol data of the TPC for each of the base stations; a TPC judgment unit 106 as a judgment unit judging, depending on whether the extracted symbol data of the CPICH falls in a predetermined region of judgment, whether the correspondent TPC is valid or invalid; and a transmission power control unit 107 as a transmission power control unit controlling the transmission power corresponding to the TPC judged as being valid.

Figure 1:
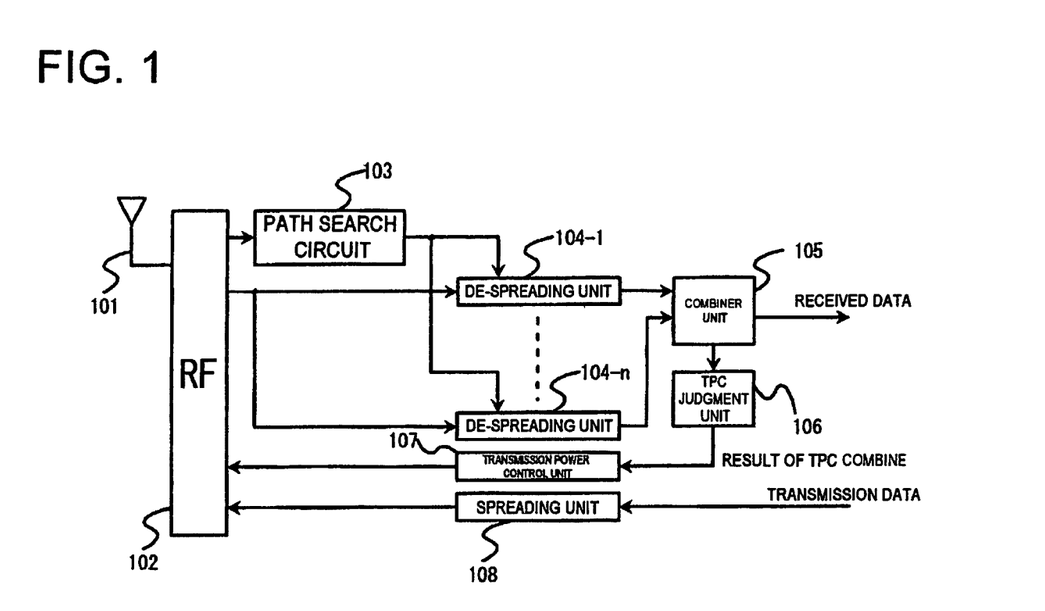
[FIG. 1] A drawing showing a configuration of a wireless communication system in a first embodiment of the present invention.

For more details, referring now to FIG. 1, the wireless communication system of the communication terminal device of this embodiment is configured by an antenna 101, an RF unit 102, a path search circuit 103, de-spreading units 104-1 to 104-n (n is an arbitrary positive integer), a combiner unit 105, a TPC judgment unit 106, a transmission power control unit 107, and a spreading unit 108.

The RF unit 102 functions as carrying out A/D conversion of signals received through the antenna 101.

The path search circuit 103 functions as detecting a correct reception timing of path timing of the converted signals.

The de-spreading units 104-1 to 104-n function as multiplying a signal from the RF 102 by a specified code as being adapted to the timing information.

The combiner unit 105 functions as sending, from the de-spread signals, TPC symbol data of the individual base stations and symbol data of the CPICH to the TPC judgment unit 106.

The TPC judgment unit 106 functions as judging whether the TPCs from the individual base stations are correctly reported based on a position of the symbol data of the CPICH, and thereby judging whether the TPCs are valid.

The transmission power control unit 107 functions as controlling transmission power at the RF unit 102 so as to attain transmission power adapted to the TPC result.

In the above-described configuration, according to a method of wireless communication using the wireless communication system of the communication terminal device, the timing information of the path timing is detected from the received signal. Next, the received signal is de-spread, based on the detected timing information and a code specified corresponding to the received signal.

Next, a symbol data of the CPICH is extracted from the de-spread received signal, based on channel estimation on the same time axis with a symbol data of the TPC for each of the base stations. Next, depending on whether the extracted symbol data of the CPICH falls in a predetermined region of judgment, whether the correspondent TPC is valid or invalid is judged. The transmission power is controlled corresponding to the TPC judged as being valid.

Operations in this embodiment will more specifically be described below, referring to FIG. 1 and FIG. 2. This system herein is on the premise of taking part in WCDMA communication between any of base stations and a communication terminal device.

First, a signal sent from a target base station enters through the antenna 101 to the RF unit 102. Thus received signal is subjected to processes including A/D conversion by the RF unit 102.

The signal after the A/D conversion process is input to the path search circuit 103 and the de-spreading units 104-1 to 104-n.

The path search circuit 103 executes calculation for allocating timing of the signal sent from the base stations to the de-spreading units 104-1 to 104-n, and posts the results to the de-spreading units 104.

Each of the de-spreading units 104-1 to 104-n carries out de-spreading by multiplying the received signal by a code determined as being adapted to the timing specified by the path search circuit 103.

The de-spread received signals are sent to the combiner unit 105.

The combiner unit 105 having the signals received from the individual de-spreading units combines symbol data of the TPC and symbol data of the CPICH for every base station, and posts the results to the TPC judgment unit 106 (A1).

The TPC judgment unit 106 having received symbol data confirms to what point a symbol data of the CPICH corresponded to a single base resides on the IQ plane (A2). When the position falls in the first quadrant of the IQ plane, the TPC of the base station under current judgment is judged as being valid, and added to objects to be judged as a valid TPC. When the position falls outside the first quadrant, the TPC is highly probable to err, and is not added to objects to be judged as a valid TPC (A3, A4).

If the TPC judgment has not been completed for all of the base stations, the process goes back to A2, and is repeated for completion (A5).

If all of the base stations have judged, and if a valid TPC determined in step A4 is available, the final UP/DOWN judgment is carried out using only such valid TPC, and the result is posted to the transmission power control unit 107 (A6→A8).

If there is not a single valid TPC determined in step A4, all target TPCs are re-judged as being valid, the final UP/DOWN judgment is carried out, and the result is posted to the transmission power control unit 107 (A6→A7→A8).

According to the control described in the above, only reliable TPCs out of those sent from the individual base stations may be used, by excluding TPC(s) highly suspicious to cause error, and exclusion of any erroneous power control prevents degradation of connection keeping ability, interference with other users, and excessive increase in power consumption of the communication terminal device.

The individual symbol data of the TPC and CPICH herein are presupposed that they are subjected to judgment-by-quadrant after being corrected by channel estimation. Alternatively in transmit diversity, the symbol data of the CPICH sent from the combiner unit 105 to the TPC judgment unit 106 may sometimes be sent from an antenna 2 while being kept in the third quadrant of the IQ plane. In this case, the first quadrant is corrected, and the then combined with an antenna 1 before being sent to the TPC judgment unit 106.

Now an extended example of this embodiment will be shown. First of all, the TPC judgment unit 106 (A2, A3) made a judgment of "valid" by confirming position in quadrant of the symbol data of the CPICH and when the position was found in the first quadrant, whereas position of judgment may be modified as shown in FIG. 3 in place of using judgment-by-quadrant, without any limitation in setting position where "valid" is judged.

The number of the de-spreading units 104 shown in FIG. 1 may arbitrarily be increased or decreased on the design basis.

The number of the base stations sending TPC to the communication terminal device is not necessarily unity, and may be set without limitation.

The symbol data of the CPICH, assumed as being on the same time axis with the TPC, may be averaged over a certain period for the purpose of improving reliability, where the averaged period may be unlimited.

According to this embodiment described in the above, correct power control may be enabled by excluding less reliable TPC(s) from objects to be judged, and thereby an ability of keeping connection may be prevented from degrading.

In addition, correct power control may be enabled by excluding less reliable TPC(s) from objects to be judged, and thereby interference with other users may be avoidable.

In addition, correct power control may be enabled by excluding less reliable TPC(s) from objects to be judged, and thereby excessive increase in power consumption of the communication terminal device may be avoidable.

Figure 4:
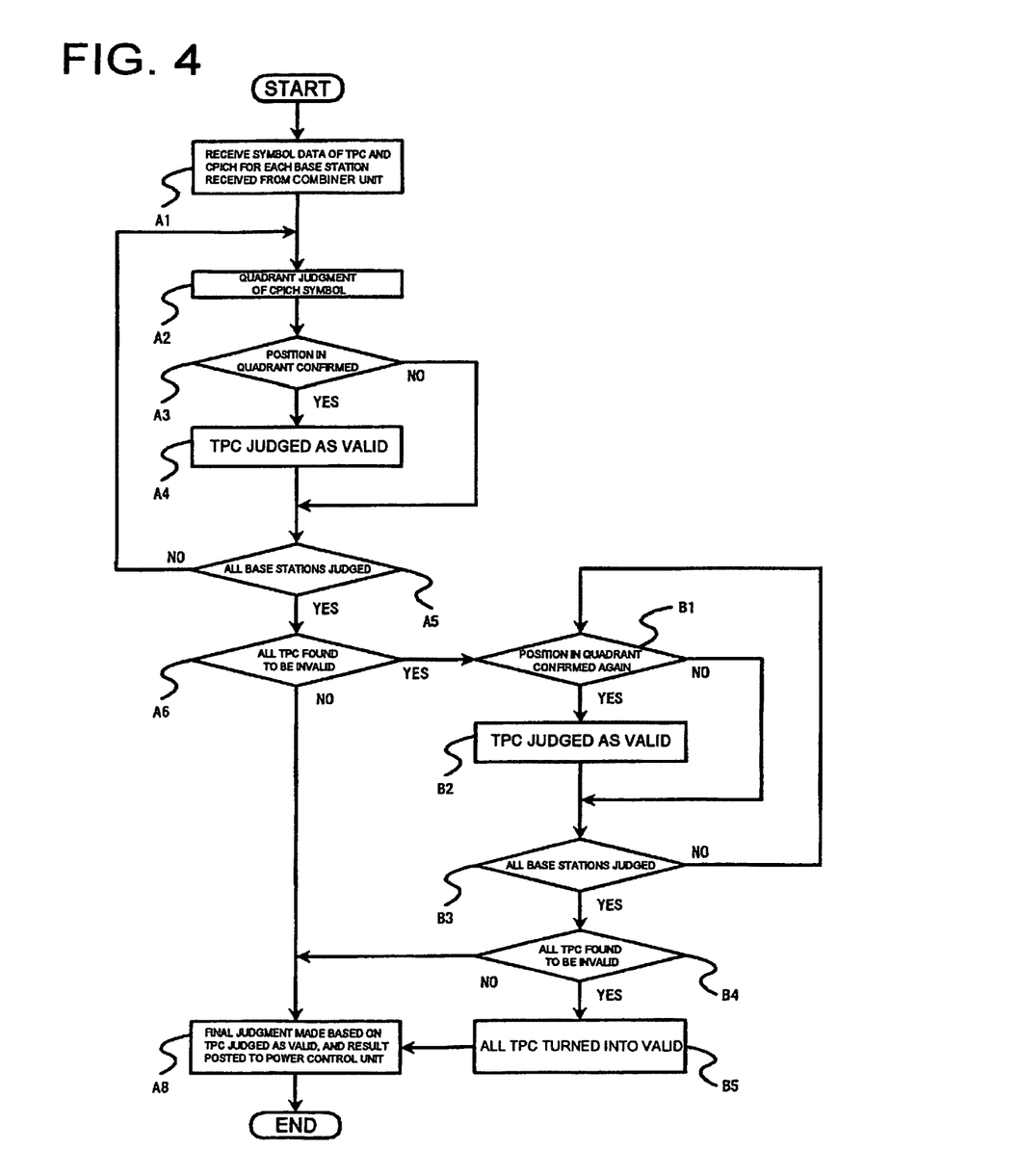
[FIG. 4] A flow chart showing process operations in a second embodiment of the present invention.

Next, a second embodiment of the present invention will be detailed, referring to FIG. 4.

Figure 2:
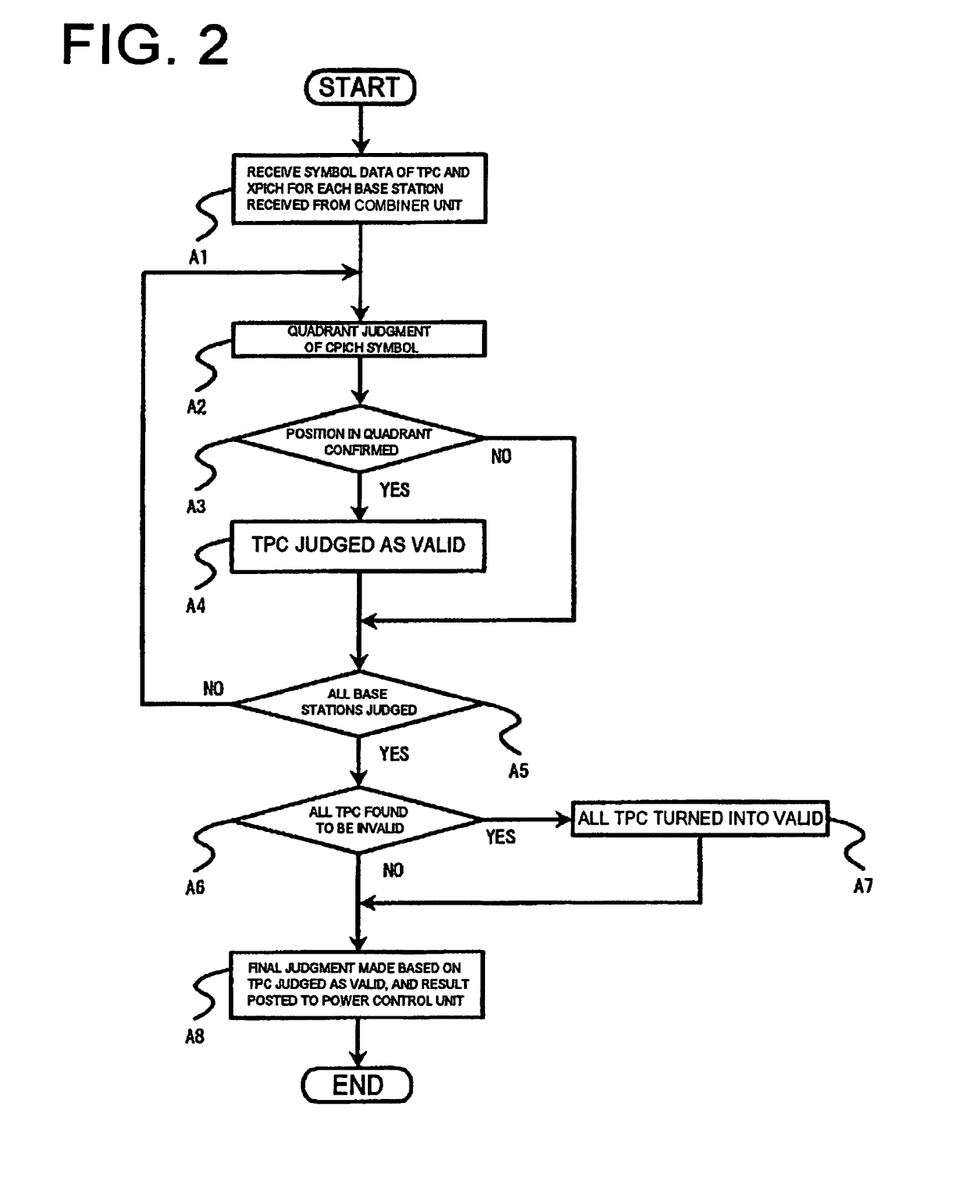
[FIG. 2] A flow chart showing process operations in the first embodiment of the present invention.
Figure 3:
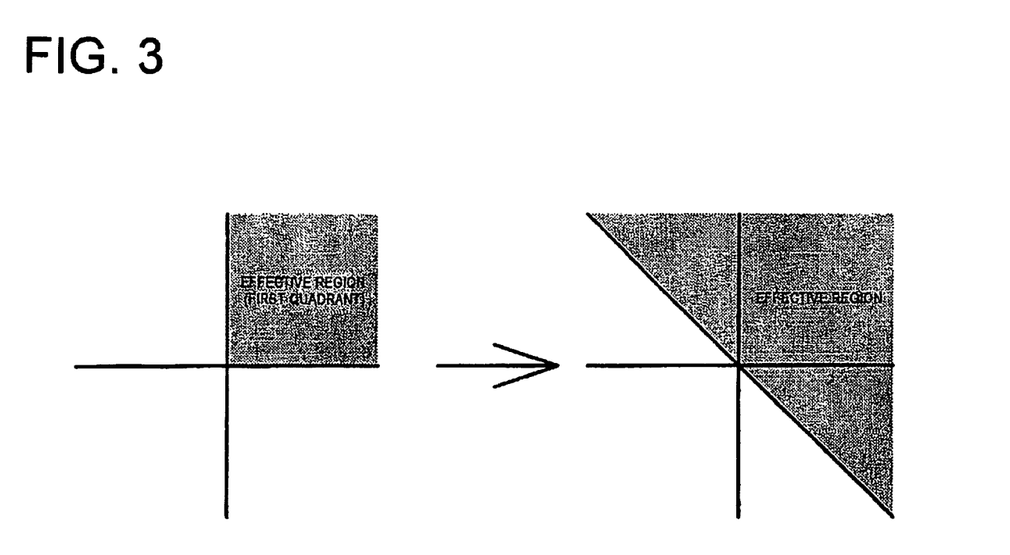
[FIG. 3] A drawing showing a setting of valid position of judgment in the first embodiment of the present invention.

Referring now to FIG. 4, in comparison with FIG. 2 relevant to the above-described first embodiment, this embodiment additionally has a step of re-judging the valid TPC under conditions eased from those in the judgment-by-quadrant in step A3, in place of judging all TPCs as valid when all TPCs were determined as invalid in step A6.

For more details, operations up to step A6 in FIG. 4 are similar to those in the first embodiment, so that the explanation therefor will not be repeated.

Figure 5:
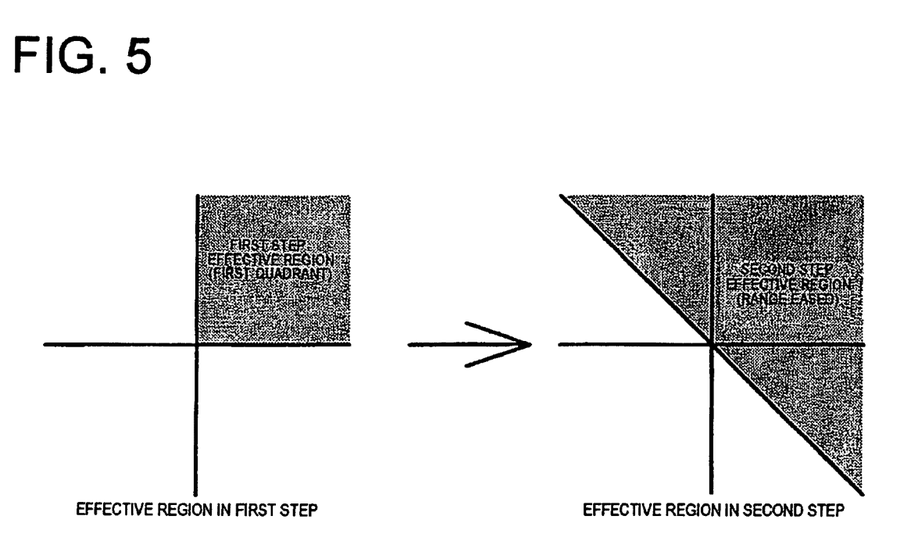
[FIG. 5] A flow chart showing a setting of valid position of judgment in the second embodiment of the present invention.

In this embodiment, if all TPCs were judged as invalid in steps A2 to A4, validity of the TPCs are re-judged under conditions of judgment eased from those in step A3, based on the position of the symbol of CPICH acquired in step A2 (see B1 in FIG. 5).

When the symbol position is judged as valid, the TPC of the base station under current judgment is judged as being valid, and added to objects to be judged as a valid TPC. When the symbol position is judged as invalid, the TPC is highly probable to err, and is not added to objects to be judged as a valid TPC (B1, B2).

If the TPC judgment has not been completed for all of the base stations, the process goes back to B1, and is repeated for completion (B3).

If all of the base stations have judged, and if a valid TPC determined in step B2 is available, the final UP/DOWN judgment is carried out using only such valid TPC, and the result is posted to the transmission power control unit 107 (B4→A8).

If there is not a single valid TPC determined in step B2, all target TPCs are re-judged as being valid, the final UP/DOWN judgment is carried out, and the result is posted to the transmission power control unit 107 (B4→B5→A8).

The region of judgment of TPC, having been divided in two stages, is not limited in the way of division.

By incorporating these processes (B1 to B5) into the above-described first embodiment, reliability of TPC may step-wisely determined, allowing exclusion of only extremely unreliable TPC(s) from judgment of transmission power.

The individual embodiments described in the above are preferred embodiments of the present invention, and may be modified in various ways without departing from the spirit of the present invention. For example, judgment of reliability was made based on the symbol data of the CPICH in the wireless communication system of the above-described embodiments, but may be made based on the pilot symbol of the DPCH (Dedicated Physical Channel).

In this case, the wireless communication system may be good enough to have a detection unit detecting timing information of path timing from the received signal; a de-spreading unit de-spreading the received signal based on the detected timing information and a code specified corresponding to the received signal; a combiner unit extracting a pilot symbol of the DPCH from the de-spread received signal, based on channel estimation on the same time axis with a symbol data of the TPC for each of the base stations; a judgment unit judging, depending on whether the extracted pilot symbol of the DPCH falls in a predetermined region of judgment, whether the correspondent TPC is valid or invalid; and a transmission power control unit controlling the transmission power corresponding to the TPC judged as being valid (not shown).

In the above-described embodiments, the individual units of the wireless communication system are realized by dedicated hardware. Alternatively, a process of realizing the functions of the individual units may be executed, by allowing the individual units to read programs which realize functions of the wireless communication systems in the above-described embodiments.

In this case, the computer program may be good enough if it is described as making a communication terminal device execute, for example, a detection process detecting timing information of path timing from the received signal; a de-spreading process de-spreading the received signal based on the detected timing information and a code specified corresponding to the received signal; a combining process extracting a symbol data of the CPICH from the de-spread received signal, based on channel estimation on the same time axis with a symbol data of the TPC for each of the base stations; a judgment process judging, depending on whether the extracted symbol data of the CPICH falls in a predetermined region of judgment, whether the correspondent TPC is valid or invalid; and a transmission power control process controlling the transmission power corresponding to the TPC judged as being valid.

Still alternatively, the program may be transmitted to other computer system, while being mediated by a computer-readable recording medium such as CD-ROM, magneto-optical disk or the like, or as being carried by transmission wave through transmission media such as the Internet, telephone line or the like.

The invention claimed is:

1. A wireless communication system of a communication terminal device receiving, by wireless, a signal containing a TPC (Transmitter Power Control) command and a CPICH (Common Pilot Channel) from a plurality of base stations, and sending, by wireless, a signal under a variable transmission power to said base stations, the system comprising:
   a detection unit detecting timing information of path timing from the received signal;
   a de-spreading unit de-spreading said received signal based on said detected timing information and a code specified corresponding to said received signal;
   a combiner unit extracting a symbol data of said CPICH from said de-spread received signal, based on channel estimation on the same time axis with a symbol data of said TPC command for each of said base stations;
   a judgment unit judging, depending on whether the extracted symbol data of said CPICH falls in a predetermined quadrant of an I-Q (In-phase and Quadrature) plane, whether said correspondent TPC command is valid or invalid; and a transmission power control unit controlling said transmission power corresponding to said TPC command judged as being valid, wherein if said TPC command is judged as being invalid, said quadrant of said I-Q plane is expanded in a step-wise manner.

2. A wireless communication system of a communication terminal device receiving, by wireless, a signal containing a TPC (Transmitter Power Control) command and a DPCH (Dedicated Physical Channel) from a plurality of base stations, and sending, by wireless, a signal under a variable transmission power to said base stations, the system comprising:
- a detection unit detecting timing information of path timing from the received signal;
- a de-spreading unit de-spreading said received signal based on said detected timing information and a code specified corresponding to said received signal;
- a combiner unit extracting a pilot symbol of said DPCH from said de-spread received signal, based on channel estimation on the same time axis with a symbol data of said TPC command for each of said base stations;
- a judgment unit judging, depending on whether the extracted pilot symbol of said DPCH falls in a predetermined quadrant of an I-Q (In-phase and Quadrature) plane, whether said correspondent TPC command is valid or invalid; and
- a transmission power control unit controlling said transmission power corresponding to said TPC command judged as being valid, wherein if said TPC command is judged as being invalid, said quadrant of said I-Q plane is expanded in a step-wise manner.

3. The wireless communication system as claimed in claim 1, wherein said transmission power control unit does not use said TPC command judged as being invalid for control of said transmission power.

4. The wireless communication system as claimed in claim 1, wherein, if all of said TPC commands of said plurality of base stations are judged as being invalid, said judgment unit turns all of said TPC commands into valid.

5. A communication terminal device receiving, by wireless, a signal containing a TPC command and a DPCH from a plurality of base stations, and sending, by wireless, a signal under a variable transmission power to said base stations, having the wireless communication system described in claim 1.

6. A method of wireless communication for a communication terminal device receiving, by wireless, a signal containing a TPC (Transmitter Power Control) command and a CPICH (Common Pilot Channel) from a plurality of base stations, and sending, by wireless, a signal under a variable transmission power to said base stations, the method comprising:
- detecting timing information of path timing from the received signal;
- de-spreading said received signal based on said detected timing information and a code specified corresponding to said received signal;
- extracting a symbol data of said CPICH from said de-spread received signal, based on channel estimation on the same time axis with a symbol data of said TPC command for each of said base stations;
- judging, depending on whether the extracted symbol data of said CPICH falls in a predetermined quadrant of an I-Q (In-phase and Quadrature) plane, whether said correspondent TPC command is valid or invalid; and
- controlling said transmission power corresponding to said TPC command judged as being valid, wherein if said TPC command is judged as being invalid, said quadrant of said I-Q plane is expanded in a step-wise manner.

7. A method of wireless communication for a communication terminal device receiving, by wireless, a signal containing a TPC (Transmitter Power Control) command and a DPCH (Dedicated Physical Channel) from a plurality of base stations, and sending, by wireless, a signal under a variable transmission power to said base stations, the method comprising:
- detecting timing information of path timing from the received signal;
- de-spreading said received signal based on said detected timing information and a code specified corresponding to said received signal;
- extracting a pilot symbol of said DPCH from said de-spread received signal, based on channel estimation on the same time axis with a symbol data of said TPC command for each of said base stations;
- judging, depending on whether the extracted pilot symbol of said DPCH falls in a predetermined quadrant of an I-Q (In-phase and Quadrature) plane, whether said correspondent TPC command is valid or invalid; and
- controlling said transmission power corresponding to said TPC command judged as being valid, wherein if said TPC command is judged as being invalid, said quadrant of said I-Q plane is expanded in a step-wise manner.

8. A non-transitory computer-readable data storage medium storing a computer program for a communication terminal device receiving, by wireless, a signal containing a TPC (Transmitter Power Control) command and a CPICH (Common Pilot Channel) from a plurality of base stations, and sending, by wireless, a signal under a variable transmission power to said base stations, the program allowing said communication terminal device to execute:
- a detection process detecting timing information of path timing from the received signal;
- a de-spreading process de-spreading said received signal based on said detected timing information and a code specified corresponding to said received signal;
- a combining process extracting a symbol data of said CPICH from said de-spread received signal, based on channel estimation on the same time axis with a symbol data of said TPC command for each of said base stations;
- a judgment process judging, depending on whether the extracted symbol data of said CPICH falls in a predetermined quadrant of an I-Q (In-phase and Quadrature) plane, whether said correspondent TPC command is valid or invalid; and
- a transmission power control process controlling said transmission power corresponding to said TPC command judged as being valid, wherein if said TPC command is judged as being invalid, said quadrant of said I-Q plane is expanded in a step-wise manner.

9. A non-transitory computer-readable data storage medium storing a computer program for a communication terminal device receiving, by wireless, a signal containing a TPC (Transmitter Power Control) command and a DPCH (Dedicated Physical Channel) from a plurality of base stations, and sending, by wireless, a signal under a variable transmission power to said base stations, the program allowing said communication terminal device to execute:
- a detection process detecting timing information of path timing from the received signal;
- a de-spreading process de-spreading said received signal based on said detected timing information and a code specified corresponding to said received signal;

a combining process extracting a pilot symbol of said DPCH from said de-spread received signal, based on channel estimation on the same time axis with a symbol data of said TPC command for each of said base stations;

a judgment process judging, depending on whether the extracted pilot symbol of said DPCH falls in a predetermined quadrant of an I-Q (In-phase and Quadrature) plane, whether said correspondent TPC command is valid or invalid; and a transmission power control process controlling said transmission power corresponding to said TPC command judged as being valid, wherein if said TPC command is judged as being invalid, said quadrant of said I-Q plane is expanded in a step-wise manner.

10. A wireless communication system comprising:

a converter unit executing A/D conversion of a received signal;

a detection unit inputting the signal after A/D conversion to a predetermined circuit to thereby detect a correct path timing, and posting the timing information to a de-spreading unit;

said de-spreading unit de-spreading the signal from said converter unit, based on the accepted timing information, and using a code specified corresponding thereto;

a combiner unit sending, from said de-spread signal, a symbol data of a CPICH (Common Pilot Channel) for which channel estimation has been completed on the same time axis with a symbol data of a TPC (Transmitter Power Control) command for each base station to a judgment unit;

said judgment unit judging whether the symbol data of the CPICH falls on in a predetermined quadrant of an I-Q (In-phase and Quadrature) plane or not, and deciding it as a valid TPC command data only when it falls in the predetermined quadrant of the I-Q plane and a transmission power control unit controlling transmission power of said converter unit, so as to attain transmission power adapted to the TPC command result determined by said judgment unit and accepted from said judgment unit, wherein if said TPC command is judged as being invalid, said quadrant of said I-Q plane is expanded in a step-wise manner.

11. The wireless communication system as claimed in claim 10, step-wisely expanding said quadrant of said I-Q plane allowed for validity, if CPICH validity is low.

12. The wireless communication system as claimed in claim 10, wherein, if validity of a TPC command is denied by said judgment unit, the TPC command received from the base station is not used for judgment of transmission power control.

13. The wireless communication system as claimed in claim 10, wherein, if said judgment unit judged all TPC commands as invalid, all TPC commands sent from target base stations are turned into valid.

14. The wireless communication system as claimed in claim 10, wherein all of said judgments made based on CPICH are replaced with pilot symbols of DPCH.

15. A method of controlling transmission power comprising:

a step of allowing a converter unit to carry out A/D conversion of a received signal;

a step of allowing a path timing detection unit to input a signal after A/D conversion into a predetermined circuit and to detect a correct path timing, and posting the timing information to a de-spreading unit;

a step of de-spreading a signal received from said converter unit using a specified code, based on timing information accepted by said de-spreading unit;

a step of allowing a combiner unit to send, from said de-spread signal, a symbol data of a CPICH (Common Pilot Channel) for which channel estimation has been completed on the same time axis with a symbol data of a TPC (Transmitter Power Control) command for each base station to a judgment unit;

a step of allowing said judgment unit to judge whether the accepted symbol data of the CPICH falls in a predetermined quadrant of an I-Q (In-phase and Quadrature) plane or not, and to decide it as a valid TPC command data only when it falls in the predetermined quadrant of the I-Q plane; and a step of allowing a transmission power control unit to control transmission power of said converter unit, so as to attain transmission power adapted to the TPC command result determined by said judgment unit and accepted from said judgment unit, wherein if said TPC command is judged as being invalid, said quadrant of said I-Q plane is expanded in a step-wise manner.

16. The wireless communication system as claimed in claim 15, step-wisely expanding said quadrant of said I-Q plane allowed for validity, if CPICH validity is low.

17. The wireless communication system as claimed in claim 15, wherein, if validity of a TPC command is denied by said judgment unit, the TPC command received from the base station is not used for judgment of transmission power control.

18. The wireless communication system as claimed in claim 15, wherein, if said judgment unit judged all TPC commands as invalid, all TPC commands sent from target base stations are turned into valid.

19. The wireless communication system as claimed in claim 15, wherein all of said judgments made based on CPICH are replaced with pilot symbols of DPCH.

20. A non-transitory computer-readable data storage medium storing a program allowing a computer to execute a process capable of realizing the functions described in claim 10.

* * * * *